US005719092A

United States Patent [19]

Arrington

[11] Patent Number: 5,719,092

[45] Date of Patent: Feb. 17, 1998

[54] FIBER/POLYMER COMPOSITE FOR USE AS A PHOTOGRAPHIC SUPPORT

[75] Inventor: Eric Eugene Arrington, Farmington, N.Y.

[73] Assignee: Eastman Kodak Company, Rochester, N.Y.

[21] Appl. No.: 656,615

[22] Filed: May 31, 1996

[51] Int. Cl.[6] ........ B32B 7/00

[52] U.S. Cl. ........ 442/189; 442/334; 442/340; 442/348; 442/903; 523/205; 523/209

[58] Field of Search ........ 442/64, 108, 340, 442/342, 903, 189, 334; 523/205, 209, 213, 214, 217

[56] References Cited

U.S. PATENT DOCUMENTS 5,252,451 10/1993 Bell ........ 430/567

OTHER PUBLICATIONS

"Composite Fabrics", BGF Industries, Inc., Aug. 1996.

"Electronic Fabrics", BGF Industries, Inc., Sep. 1996.

"Fiberglass Reinforcements", FibreGlast Developments Corporation, Jan. 1996.

*Primary Examiner*—Christopher Raimund
*Attorney, Agent, or Firm*—Carl F. Ruoff

[57] ABSTRACT

The present invention is a polymer/fiber matrix used as a photographic support. The fibers are of a specific glass composition and the polymer can be polyethylene, polypropylene, polystyrene, polybutylene and copolymers thereof. The matrix preferably includes between 1% and 79% fibers with the fibers having a diameter of between 0.001 mm and 0.01 mm.

13 Claims, No Drawings

FIBER/POLYMER COMPOSITE FOR USE AS A PHOTOGRAPHIC SUPPORT

FIELD OF THE INVENTION

The present invention relates to the field of photographic supports. More specifically, the present invention relates to photographic supports that have increased stiffness.

BACKGROUND OF THE INVENTION

Photographic paper is currently composed of a cellulose paper base, with a polymeric coating on both sides to protect the paper from moisture. On the side of the paper which the photograph is displayed, the polymeric coating typically contains a light scattering filler, such as $TiO_2$, $CaCO_3$, or a combination thereof, an antioxidant to reduce processing damage caused by high temperature extrusion, optical brighteners, and other addenda for UV protection, light stabilization, etc.

The polymer which is most often used is polyethylene, and in some cases polyester. The thickness and stiffness of the paper and polymer layers must be high enough to meet the stiffness specification of the particular photographic paper of interest. The greater the stiffness of any one of the components, the lower the overall thickness of the product needs to be in order to meet the stiffness specification. Therefore, if the stiffness of the resin is increased, a benefit can be realized either as an increase in the overall stiffness of the product, or a reduction in the thickness necessary to achieve the stiffness specification. Since photographic paper is wound in a roll, this means that a roll of a given diameter can hold a larger area of paper if the thickness is reduced.

As a result, there is a need for a formulation which will increase the stiffness or modulus of the polymer layer, without deleteriously affecting the whiteness or appearance of the photographic side resin.

SUMMARY OF THE INVENTION

The invention provides a photographic support comprising polymer/fiber matrix, where the polymer is any thermoplastic suitable for photographic use, and the fibers comprise a glass which is composed of $SiO_2$ from 52% to 65%, $Al_2O_3$ from 12–25%, CaO from 16–25%, MgO from 0–10%, $B_2O_3$ from 8–13%, $Na_2O$ from 0–3%, $TiO_2$ from 0–12%, $FeO_2O_3$ from 0–0.4% and $Fe_2$ from 0–0.5%, the fibers being coated with a sizing agent selected from the group consisting of alkoxysilanes film-forming polymers such as polyvinyl acetate, polyvinyl alcohol, aqueous epoxies and aqueous polyurethanes.

In a preferred embodiment the fibers have a diameter of from 0.001–0.01 mm and define a volume fraction of 0.01–0.79 based on the total volume of the composite. In a preferred embodiment, the fibers define a fabric which is woven as a plain weave.

In alternate embodiments the fibers define a fabric which is woven as a twill weave, crowfoot weave, long-shaft satin weave, or leno weave with 1–1000 warp fibers and fill fibers/mm.

DESCRIPTION OF PREFERRED EMBODIMENTS

The polymer comprises any thermoplastic material known in the photographic art. Representative of these are polyethylene, polypropylene, polystyrene, polybutylene, and copolymers thereof. Polyethylene of low, medium or high density is preferred. The polyolefin can be copolymerized with one or more copolymers including polyesters, such as, polyethylene terephthalate, polyethylene naphthalate, polysulfones, etc. The thermoplastic material can also include nylon and polycarbonate. In addition, the usual photographic addenda are added.

In addition to the thermoplastic, the matrix includes between 1% and 79% fibrous cloth, with 1%–30% being preferred and 10–20% being most preferred.

The fibrous cloth includes glass or polymeric fibers, with the fibers having a refractive index above the refractive index of the polymer matrix, and the fibers being either clear or white, with glass fibers being the most preferred. The diameter of the glass fibers must be between 0.001 and 0.01 mm, with the preferred diameter being 0.001 to 0.005 mm, and the most preferred is 0.001 to 0.002 mm. The fibers must be continuous. The glass in the fibers includes $SiO_2$ from 52% to 65% with 52–56% being preferred, $Al_2O_3$ from 12–25%, with 12–16% being preferred, CaO from 16–25%, with 16–20% being preferred, MgO from 0–10%, with 0–6% being preferred, $B_2O_3$ from 8–13%, with 8–11% being preferred, $Na_2O$ from 0–3%, with 0% being preferred, $TiO_2$ from 0–12%, with 0–0.4% being preferred, $Fe_2O_3$ from 0–0.4% with 0% being preferred, and $Fe_2$ from 0–0.5% with 0% being preferred. Fibrous cloth meeting these specifications is available from Fibre Glast Development Corporation and BGF Industries, Inc.

In a preferred embodiment the fibers define a volume fraction of 0.01–0.79 based on the total volume of the composite, the most preferred range being from 0.1 to 0.3.

The glass fibers can be coated with a sizing agent to ensure that it will stick to the polymer. The amount of sizing agent should be such that the fibers are uniformly covered by a sizing layer between 1 nanometer and 1 micrometer in thickness, with the preferred amount being 10 nanometers. These sizing agents can consist of polymeric emulsions of silane coupling agents, comprising 20%–28% of aqueous epoxy emulsion, with the preferred amount being 25.5%, emulsified mineral oil of from 30% to 40% with the preferred amount being 39.7%, fatty acid ester of tetraethylene pentamine of from 10–15% with a preferred amount being 12.8%, gamma-methacryloxypropyltrimethoxysilane of from 10–20% with the preferred amount being 15.3%, gamma aminopropyltrimethoxysilane of from 5–7% with the most preferred amount being 5.9%, citric acid of from 0.0% to 2.0% with the preferred amount being 1%, and ammonium chloride of from 0–1%, with the preferred amount being 0.2%, as in accordance with U.S. Pat. No. 4,933,381.

The fabric can be woven into a fabric as a plain weave, twill weave, crowfoot weave, long-shaft satin weave, or leno weave, with the preferred being a plain weave. The number of fibers per mm can be 1–1000, with the preferred being 10–100, and the most preferred being 20–100.

The paper base employed in the material can be the standard photographic base of from 0.025 mm to 0.18 mm, or the fabric/polymer composite can replace the paper layer entirely. The standard photographic paper base is preferred, and the thickness range of 0.1 to 0.155 mm is preferred.

EXAMPLE 1

The emulsion side resin layer is 20% glass of the constitution 54% $SiO_2$, 14% $Al_2O_3$, 18% CaO, 4% MgO, and 10% $B_2O_3$, the previously described preferred sizing agent and 80% low density polyethylene, the composite layer being 0.0254 mm thick. The layer is coated on paper which is 0.1524 mm thick, and the backside consists of medium density polyethylene which is 0.0254 mm in thickness. This photographic paper shows a 120% improvement in bending stiffness over the current art.

EXAMPLE 2

Same as Example 1, except the thickness of the paper is reduced to 0.112 mm, giving the same stiffness as the current art; however, the overall length which can be wound into a given diameter roll increases by 36%.

EXAMPLE 3

Same as Example 1, except 1% of the glass is used, resulting in an increase of 8% in bending stiffness over the current art.

EXAMPLE 4

Same as Example 3, except the thickness of the paper is reduced to 0.15 mm, giving the same stiffness as the current art, however, the overall length which can be wound into a given diameter roll increases by 2%.

EXAMPLE 5

Same as Example 1, except the composition of the glass is changed to 65% $SiO_2$, 25% $Al_2O_3$, and 10% MgO. This results in an increase in bending stiffness of 140% over the current art.

EXAMPLE 6

Same as Example 5, except the thickness of the paper is 0.107 mm, giving the same stiffness as the current art, however the overall length which can be wound into a given diameter roll increases by 42%.

EXAMPLE 7

Same as Example 1, except 20% polyester fiber is used instead of glass fiber. This yields a stiffness improvement of 40% over the current art.

EXAMPLE 8

Same as Example 7, except the thickness of the paper is 0.132 mm, giving the same stiffness as the current art, however, the overall length which can be wound into a given diameter roll increases by 15%.

EXAMPLE 9

Same as Example 1, except 20% nylon 66 is used instead of glass fiber. This yields a stiffness improvement of 12% over the current art.

EXAMPLE 10

Same as Example 9, except the thickness of the paper is 0.145 mm, giving the same stiffness as the current art, however the overall length which can be wound into a given diameter roll increases by 5%.

EXAMPLE 11

Silver halide emulsions were coated on the paper of Example 2. The emulsions were chemically and spectrally sensitized as described below.

Blue Sensitive Emulsion (Blue EM-1, prepared similarly to that described in U.S. Pat. No. 5,252,451, column 8, lines 55–68): A high chloride silver halide emulsion was precipitatedby adding approximately equimolar silver nitrate and sodium chloride solutions into a well-stirred reactor containing gelatin peptizer and thioether ripener. $Cs_2Os(NO)Cl_5$ dopant was added during the silver halide grain formation for most of the precipitation, followed by a shelling without dopant. The resultant emulsion contained cubic shaped grains of 0.76 μm in edgelength size. This emulsion was optimally sensitized by the addition of a colloidal suspension of aurous sulfide and heat ramped up to 60° C. during which time blue sensitizing dye BSD-1, 1-(3-acetamidophenyl)-5-mercaptotetrazole and potassium bromide were added. In addition, iridium dopant was added during the sensitization process.

Green Sensitive Emulsion (Green EM-1): A high chloride silver halide emulsion was precipitated by adding approximately equimolar silver nitrate and sodium chloride solutions into a well-stirred reactor containing gelatin peptizer and thioether ripener. $Cs_2Os(NO)Cl_5$ dopant was added during the silver halide grain formation for most of the precipitation, followed by a shelling without dopant. Iridium dopant was added during the late stage of grain formation. The resultant emulsion contained cubic shaped grains of 0.30 μm in edgelength size. This emulsion was optimally sensitized by addition of green sensitizing dye GSD-1, a colloidal suspension of aurous sulfide, heat digestion followed by the addition of 1-(3-acetamidophenyl)-5-mercaptotetrazole and potassium bromide.

Red Sensitive Emulsion (Red EM-1): A high chloride silver halide emulsion was precipitated by adding approximately equimolar silver nitrate and sodium chloride solutions into a well-stirred reactor containing gelatin peptizer and thioether ripener. The resultant emulsion contained cubic shaped grains of 0.40 μm in edgelength size. This emulsion was optimally sensitized by the addition of a colloidal suspension of aurous sulfide followed by a heat ramp, and further additions of 1-(3-acetamidophenyl)-5-mercaptotetrazole, potassium bromide and red sensitizing dye RSD-1. In addition, iridium dopant was added during the sensitization process.

Coupler dispersions were emulsified by methods well known to the art, and the following layers were coated on a polyethlene resin coated paper support, that was sized as described in U.S. Pat. No. 4,994,147 and pH adjusted as described in U.S. Pat. No. 4,917,994. The polyethylene layer coated on the emulsion side of the support contained a mixture of 0.1% (4,4'-bis(5-methyl-2-benzoxazolyl) stilbene and 4,4'-bis(2-benzoxazolyl) stilbene, 12.5% $TiO_2$, and 3% ZnO white pigment. The layers were hardened with bis (vinylsulfonyl methyl) ether at 1.95% of the total gelatin weight.

| | |
|---|---|
| Layer 1: Blue Sensitive Layer | |
| Gelatin | 1.530 g/m$^2$ |
| Blue Sensitive Silver (Blue EM-1) | 0.280 g Ag/m$^2$ |
| Y-1 | 1.080 g/m$^2$ |
| Dibutyl phthalate | 0.260 g/m$^2$ |
| 2-(2-butoxyethoxy)ethyl acetate | 0.260 g/m$^2$ |
| 2,5-Dihydroxy-5-methyl-3-(1-piperidinyl)-2-cyclopenten-1-one | 0.002 g/m$^2$ |
| ST-16 | 0.009 g/m$^2$ |
| Layer 2: Interlayer | |
| Gelatin | 0.753 g/m$^2$ |
| Dioctyl hydroquinone | 0.094 g/m$^2$ |
| Dibutyl phthalate | 0.282 g/m$^2$ |
| Disodium 4,5 Dihydroxy-m-benzenedisulfonate | 0.065 g/m$^2$ |

-continued

| | |
|---|---|
| SF-1 | 0.002 g/m² |
| Layer 3: Green Sensitive Layer | |
| Gelatin | 1.270 g/m² |
| Green Sensitive Silver (Green EM-1) | 0.263 g Ag/m² |
| M-1 | 0.389 g/m² |
| Dibutyl phthalate | 0.195 g/m² |
| 2-(2-butoxyethoxy)ethyl acetate | 0.058 g/m² |
| ST-2 | 0.166 g/m² |
| Dioctyl hydroquinone | 0.039 g/m² |
| Phenylmercaptotetrazole | 0.001 g/m² |
| Layer 4: UV Interlayer | |
| Gelatin | 0.484 g/m² |
| UV-1 | 0.028 g/m² |
| UV-2 | 0.159 g/m² |
| Dioctyl hydroquinone | 0.038 g/m² |
| 1,4-Cyclohexylenedimethylene bis(2-ethylhexanoate) | 0.062 g/m² |
| Layer 5: Red Sensitive Layer | |
| Gelatin | 1.389 g/m² |
| Red Sensitive Silver (Red EM-1) | 0.187 g Ag/m² |
| C-3 | 0.424 g/m² |
| Dibutyl phthalate | 0.414 g/m² |
| UV-2 | 0.272 g/m² |
| 2-(2-butoxyethoxy)ethyl acetate | 0.035 g/m² |
| Dioctyl hydroquinone | 0.004 g/m² |
| Potassium tolylthiosulfonate | 0.003 g/m² |
| Potassium tolylsulfinate | 0.0003 g/m² |
| Layer 6: UV Overcoat | |
| Gelatin | 0.484 g/m² |
| UV-1 | 0.028 g/m² |
| UV-2 | 0.159 g/m² |
| Dioctyl hydroquinone | 0.038 g/m² |
| 1,4-Cyclohexylenedimethylene bis(2-ethylhexanoate) | 0.062 g/m² |
| Layer 7: SOC | |
| Gelatin | 1.076 g/m² |
| Polydimethylsiloxane | 0.027 g/m² |
| SF-1 | 0.009 g/m² |
| SF-2 | 0.004 g/m² |
| Tergitol 15-S-5 ™ | 0.003 g/m² |
| DYE-1 | 0.018 g/m² |
| DYE-2 | 0.009 g/m² |
| DYE-3 | 0.007 g/m² |

The coated paper of this example performed as expected.

The invention has been described in detail with particular reference to certain preferred embodiments thereof, but it will be understood that variations and modifications can be effected within the spirit and scope of the invention.

I claim:

1. A photographic support comprising: a polymer/fiber matrix including:

a thermoplastic polymer;

continuous glass fibers having a diameter of from 0.001 mm to 0.01 mm comprising:

from about 52% to about 65% $SiO_2$;

from about 12% to about 25% $Al_2O_3$;

from about 16% to about 25% CaO;

from about 0% to about 10% MgO;

from about 8% to about 13% $B_2O_3$;

from about 0% to about 3% $Na_2O$;

from about 0% to about 12% $TiO_2$;

from about 0% to about 0.4% $FeO_3$;

from about 0% to about 0.5% $Fe_2$; and a sizing agent.

2. The photographic support according to claim 1, wherein the sizing agent is selected from the group consisting of alkoxysilanes, polyvinyl alcohol, polyvinyl acetate, aqueous epoxies and aqueous polyurethanes.

3. The photographic support according to claim 1, wherein the fibers have a diameter of from about 0.001 mm to about 0.005 mm.

4. The photographic support according to claim 1, wherein the glass fibers comprise a volume fraction of from 0.01 to 0.79 of the polymer/fiber matrix.

5. The photographic support according to claim 1, wherein the glass fibers are woven.

6. The photographic support according to claim 5, wherein the woven fibers comprise a plain weave.

7. The photographic support according to claim 5, wherein the woven fibers comprise a twill weave.

8. The photographic support according to claim 5, wherein the woven fibers comprise a crowfoot weave.

9. The photographic support according to claim 5, wherein the woven fibers comprise a long-shaft satin weave.

10. The photographic support according to claim 5, wherein the woven fibers comprise a leno weave.

11. The photographic support according to claim 5, wherein the woven fibers include between 1 and 1000 warp fibers and fill fibers/mm.

12. The photographic support according to claim 1, wherein the thermoplastic polymer is selected from the group consisting of polyethylene, polypropylene, polystyrene, polybutylene and copolymers thereof.

13. The photographic support according to claim 1, wherein the thermoplastic polymer comprises a polyolefin copolymerized with a polyester or polysulfone.

* * * * *